(12) United States Patent
Sun

(10) Patent No.: US 8,156,729 B2
(45) Date of Patent: Apr. 17, 2012

(54) VARIABLE ENGINE OUT EMISSION CONTROL ROADMAP

(75) Inventor: Min Sun, Troy, MI (US)

(73) Assignee: Detroit Diesel Corporation, Detroit, MI (US)

( * ) Notice: Subject to any disclaimer, the term of this patent is extended or adjusted under 35 U.S.C. 154(b) by 1031 days.

(21) Appl. No.: 11/961,175

(22) Filed: Dec. 20, 2007

(65) Prior Publication Data

US 2009/0158706 A1 Jun. 25, 2009

(51) Int. Cl.
*F01N 3/00* (2006.01)

(52) U.S. Cl. ............... 60/277; 60/274; 60/295; 60/297; 60/301

(58) Field of Classification Search ............. 60/274, 60/276, 277, 286, 295, 301, 303, 297, 311
See application file for complete search history.

(56) References Cited

U.S. PATENT DOCUMENTS

| | | | |
|---|---|---|---|
| 5,857,163 A * | 1/1999 | Trombley et al. | 701/101 |
| 6,363,771 B1 | 4/2002 | Liang et al. | |
| 6,482,762 B1 | 11/2002 | Ruffin et al. | |
| 6,871,490 B2 | 3/2005 | Liang et al. | |
| 6,882,929 B2 | 4/2005 | Liang et al. | |
| 6,901,748 B2 | 6/2005 | Gomulka | |
| 6,981,368 B2 * | 1/2006 | van Nieuwstadt et al. | 60/277 |
| 7,055,311 B2 | 6/2006 | Beutel et al. | |
| 7,067,319 B2 | 6/2006 | Wills et al. | |
| 7,212,908 B2 | 5/2007 | Li et al. | |
| 7,281,518 B1 | 10/2007 | Allain et al. | |
| 7,587,889 B2 * | 9/2009 | Frazier et al. | 60/285 |
| 7,603,846 B2 * | 10/2009 | Lueders et al. | 60/277 |
| 7,617,672 B2 * | 11/2009 | Nishina et al. | 60/277 |
| 7,685,810 B2 * | 3/2010 | Hirata et al. | 60/277 |
| 2005/0207936 A1 | 9/2005 | Berryhill et al. | |
| 2007/0079598 A1 * | 4/2007 | Bailey et al. | 60/278 |

* cited by examiner

*Primary Examiner* — Binh Q Tran
(74) *Attorney, Agent, or Firm* — Bill C. Panagos; Rader, Fishman & Grauer PLLC

(57) ABSTRACT

A method for operating an internal combustion engine for variable engine out NOx control talking into account the age of the SCR.

13 Claims, 7 Drawing Sheets

$$Age_{SCR} = \sum factor_{age} \times t_{step}$$

$desEGR\_rate = desEGR\_rate_{fresh\_SCR} \times y_{fresh\_SCR\_membership} + desEGR\_rate_{aged\_SCR} \times y_{aged\_SCR\_membership}$

VARIABLE ENGINE OUT EMISSION CONTROL ROADMAP

TECHNICAL FIELD

Heavy duty diesel engines have been the subject of much legislation to reduce emission levels. One way to reduce emissions, especially NOx emissions, is by adapting engine operation to include Selective Catalytic Reducers (SCR) in the exhaust systems to reduce the amount of NOx emitted to the atmosphere. A shortcoming to this approach has been that as the SCR ages, it efficiency decreases and the SCR is further affected by high temperature gasses in the exhaust stream. Normal engine operation is to calibrate engine out NOx emissions to a level so that the tail pipe NOx meets legislated requirements with an aged SCR. However, this approach is not always satisfactory, especially when the SCR is new, as the engine calibration must accommodate the increased efficiency of a new system as opposed to an older system or a system that is aging. In addition, operating an engine as if the SCR is already aged will unduly age the SCR by subjecting it to higher temperature exhaust gasses than is necessary for a new SCR to be effective. Fuel efficiency is also adversely impacted when calibrating the engine to operate in a manner that assumes an aged SCR. By using and SCR aging factor to determine the SCR age and including it as a factor determining SCR efficiency, tables can be created using 3-D tables with engine speed (RPM) and load (torque) with desired tailpipe NOx as setpoints to control engine out NOx. The desired engine out NOx may be determined by using the current SCR efficiency and desired tailpipe NOx and fuzzy logic may be utilized to manage engine control setpoints, such as EGR, Boi, NOP, etc, to form a feedforward control portion of an engine control system. A closed loop control (engine out NOx sensor feedback) can be used to accurately control engine out NOx.

These and other aspects can be readily understood by reading the specification and drawings.

BRIEF SUMMARY OF THE INVENTION

In one aspect, the present invention is related to a method to operate an internal combustion engine equipped with an electronic control system (ECS) having memory, and an exhaust system including a diesel particulate filter (DPF) and a Selective Catalytic Reducer (SCR) for NOx emission reduction over all ages of said SCR. The steps comprise determining the age of the SCR with an age factor; determining SCR efficiency using SCR age as a factor of SCR efficiency; determining desired tailpipe NOx emissions as setpoints to control engine out NOx emissions; determining desired engine out NOx emission by using current SCR efficiency and desired tailpipe NOx emissions; using fuzzy logic to manage engine control setpoints which forms a forward control portion of the said ECS; and using closed loop engine out NOx sensor feedback control to accurately control engine out NOx emissions.

The engine control setpoints include beginning of injection (BOI) exhaust gas recirculation valve (EGR), and nozzle opening pressure (NOP), and the NOx setpoints are determined from a 3D table in memory with engine load and engine rpm as inputs. The engine out NOx is controlled according to SCR deterioration age includes determining the efficiency of the SCR and the amount of NOx engine out emission produced in a predetermined time period, reducing engine fuel consumption based upon said SCR efficiency and NOx engine out and maximize DPF regeneration, extending the DPF active regeneration interval.

The SCR aging factor is determined according to the formula $$Age_{SCR} = \Sigma factor_{age} \times t_{step}$$

Wherein t is time.

The desired engine out NOx is determined based upon desired tailpipe NOx setpoint value and SCR NOx reduction efficiency according to the formula $$NOx_{de\text{-}engine\ out} = \frac{NOx_{des\text{-}tailpipe\text{-}out}}{1 - \eta_{scr}}$$

Wherein $\eta$ is the SCR efficiency factor

The fuzzy logic based setpoint management is determined according to the formula:

$$des\Gamma rate = des\Gamma rate_{fresh\_SCR} \times Y_{fresh\_SCR\_membership} + des\Gamma\_rate_{aged\_SCR} \times Y_{aged\_SCR\_membership}$$

wherein:

Y is the SCR efficiency value and $\Gamma$ may be selected from EGR, BOI and NOP.

In order to control the engine to vary the engine out NOx over the life of the SCR, the engine load, engine rpm and desired engine out NOx as inputs, EGR, BOI and NOP relations at conditions of minimum BSFC, given exhaust temperature and acceptable particulate matter (PM) rate are defined.

Fuzzy logic membership function is performed according to the formula:

$$a(x3-x)+b(x2-x)-x+1$$

wherein a and b are 3D tables with engine rpm and load as inputs, $a = f_a$(rpm, load)

$b = f_b$(rpm, load)

and $$des\ NOx_{normalized} = \frac{des\ NOx_{current} - des\ NOx_{fresh\_SCR}}{des\ NOx_{aged\_SCR} - des\ NOx_{fresh\_SCR}}$$

When a and b are zero, the fuzzy logic become linear interpolation. The method further includes determining fresh and aged SCR engine setpoints, table for EGR, BOI and NOP, for each operation point choosing between 5 and 6 EGR rates between fresh and aged SCR EGR rates; conducting engine tests at each EGR rate varying BOI and NOP; recording NOx, PM and BSFC at each combination of EGR, BOI and NOP; combining EGR, BOI and NOP at a given NOx with minimum BSFC and accepted PM, and determining a membership function constant a and b for EGR, BOI and NOP.

The method further contemplates using a closed loop control to compensate for engine to engine variation and reduce calibration effort. Adaptive logic may be used to address any conflict between PID control stability and response.

DETAILED DESCRIPTION OF THE INVENTION

Figure 1:
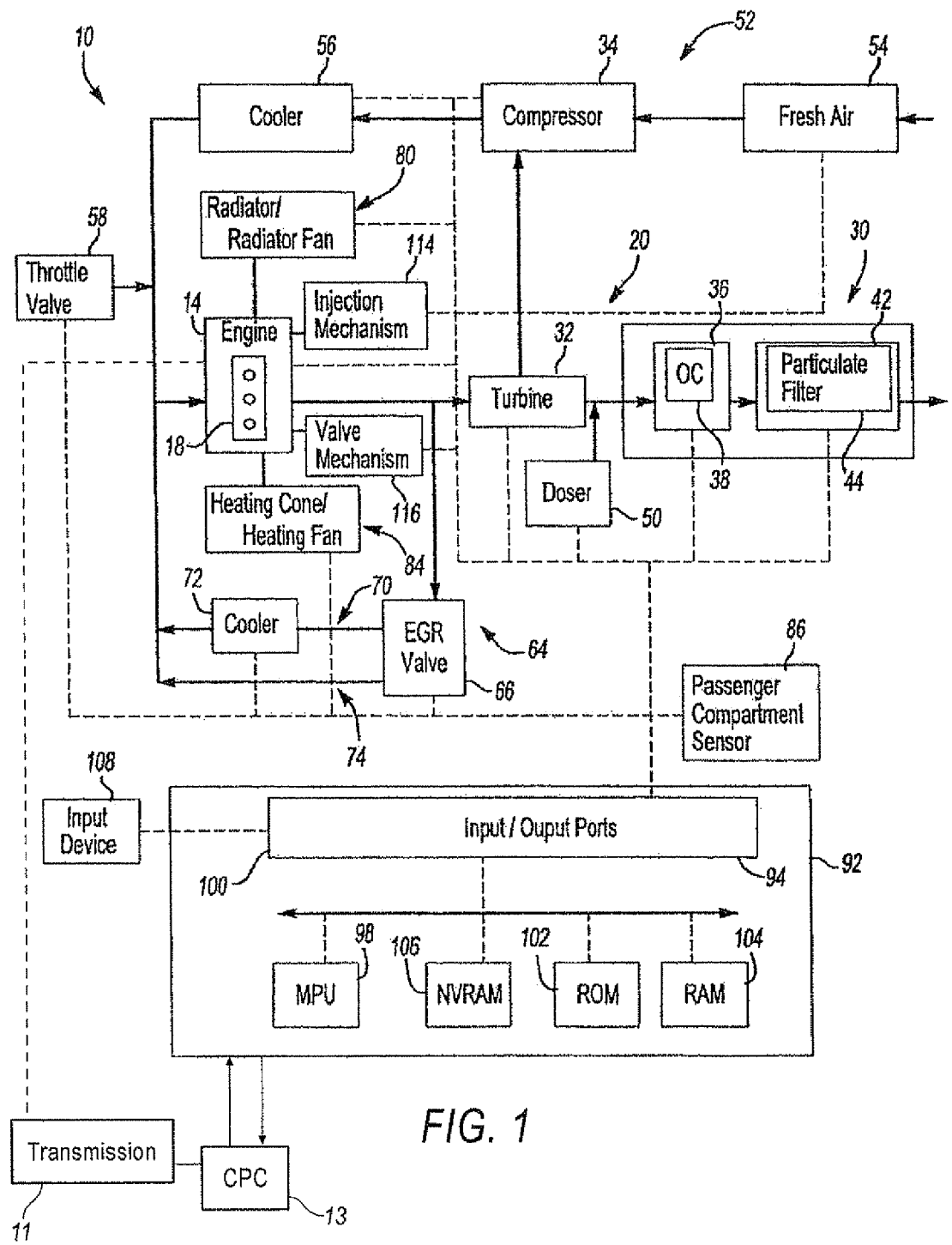
FIG. 1 is a schematic representation of an engine with a controller and an exhaust system including an SCR.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel. The engine is cooperatively engaged by transmission 11 by a flywheel and either a clutch or a torque converter as is customary with engines and transmissions. The transmission has an ECU 13 that is in data communication with the engine control system, as will herein after be described.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the ER valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such subsystems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (ECU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the ECU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, may be configured for permanently storing emission related fault codes in memory that is not accessible to unauthorized service tools. Authorized service tools may be given access by a password and in the event access is given, a log is made of the event as well as whether any changes that are attempted to made to the stored fault codes. It is contemplated that any number of faults may be stored in permanent memory, or rewritable memory, and that preferably such faults are stored in rewritable memory.

A Selective Catalytic Reducer (SCR) 118 is further provided in the exhaust system to reduce the amount of NOx in the tailpipe exhaust to conform with legislative requirements. SCR efficiency may be subjected to declines due to age, and subjection to high temperature exhaust gasses. Usually, engine controller 92 is programmed to operate the engine as if the SCR was already aged, thereby ensuring that the NOx emissions out of the tailpipe conform to legislative requirements, but subjecting the engine operator to a fuel penalty as fuel efficiency may be adversely affected by this mode of operation. In addition, a new SCR may be prematurely aged by operating the engine as if the SCR was an aged unit by subjecting the SCR to high temperature exhaust gasses that may prematurely age the unit. This shortens the life of the SCR as well as further affecting the efficiency of the SCR. Accordingly, there is a need for a method to operate the engine that considers the age of the SCR in order to meet legislative mandates regarding NOx emissions.

Figure 2:
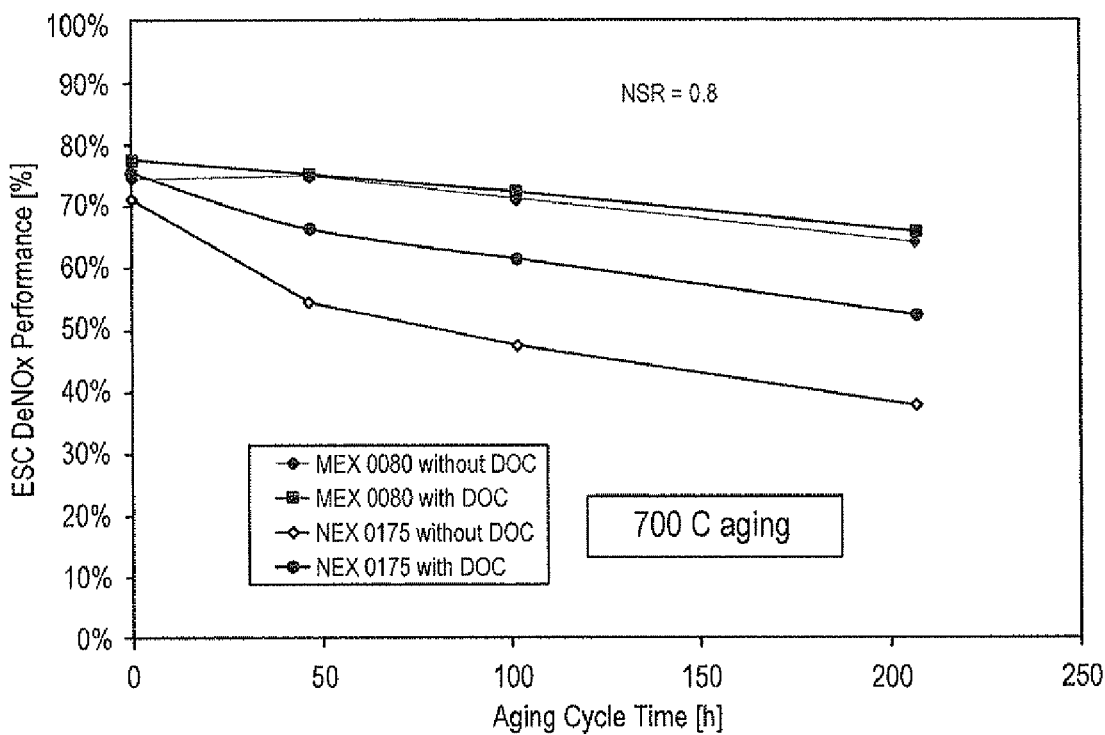
FIG. 2 is a graph showing a relationship between SCR deNOx efficiency-v-Aging Time and Variable Engine NOx Control.

FIG. 2 is a graph representing a relationship between SCR deNOx efficiency-v-Aging Time and Variable Engine NOx Control. Specifically, the X axis is the aging cycle time in hours, and the Y axis is the SCR DeNox performance in percent efficiency. The exhaust gas temperature is about 700° C., which was maintained in order to simulate aging of the SCR. Line 120 is an exhaust system A without a diesel oxidation catalyst (DOC). Line 122 is an identical exhaust system equipped with a DOC (ADOC). Line 124 is a different exhaust system B without a DOC and line 126 is the same exhaust system as used for line 124, but equipped with a DOC (BDOC). By resort to the graph, it can be seen that the SCR DeNox efficiency for all systems without a DOC was between 70% and 80% efficiency at 0 hours. However, the exhaust system A used for line 120 had an efficiency of about 65% at 200 hours operation at 700° C., whereas system B without the DOC had an efficiency rating of about 40% at 200 hours operation at 700° C. Thus, the difference in efficiency between the two systems after 200 hours operation at 700° C. was about 20%. Moreover, when system A was equipped with a DOC, the efficiency was about the same as a system without a DOC. However, when system B was equipped with a DOC, it had a efficiency of about 55% after 200 hours operation at 700° C. Thus, the difference between the two systems equipped with a DOC after operation of 200 hours at 700° C. was about 10%. To control engine out NOx level according to SCR deterioration, the following examples are illustrative.

90% SCR efficiency+2(g/hp–hr)engine out NOx→0.2 (g/hp–hr)tailpipe NOx

80% SCR efficiency+1(g/hp–hr)engine out NOx→0.2 (g/hp–hr)tailpipe NOx

Thus, it can be understood that different amounts of NOx may be catalyzed by the SCR at different efficient rates. When the SCR is younger, it has a higher efficiency rate that when the SCR is older, or aged. When the SCR is at 90% efficiency, it may process 2 g/hp–hr of NOx, as compared to the 1 g/hp–hr of NOx that may be catalyzed when the SCR is operating at about 80% efficiency. By understanding the SCR DeNox efficiency over age of the SCR, it is possible to reduce fuel consumption and maximize DPF passive regeneration, thereby extending DPF active regeneration interval and reduce aftertreatment system aging rate and DPF fuel consumption.

Figure 3:
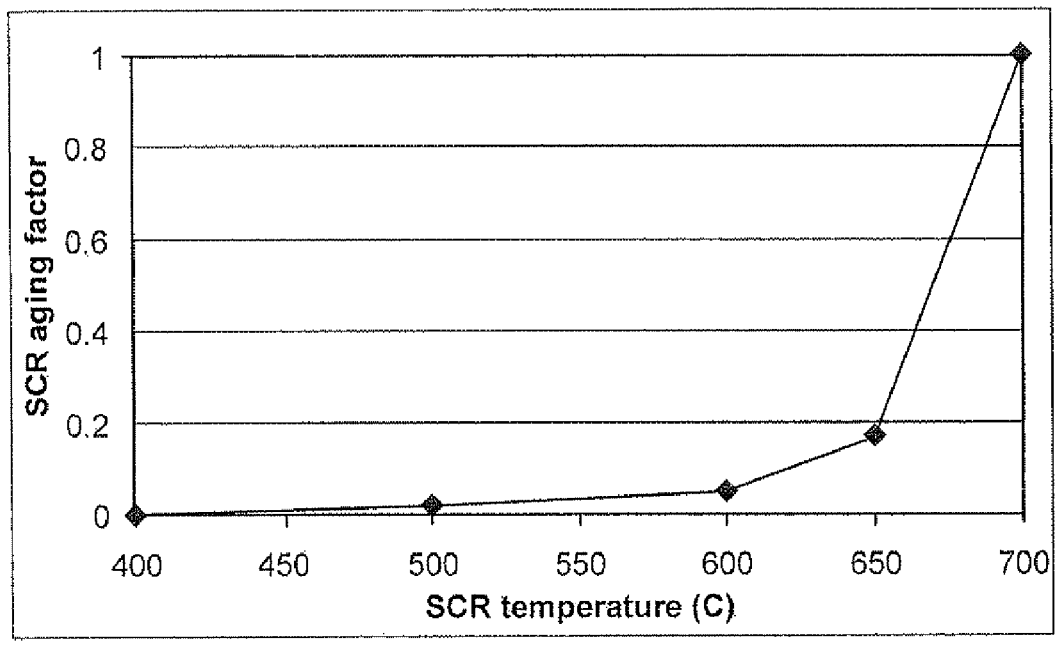
FIG. 3 is a graph representing SCR Age Concept and SCR Aging Model.

FIG. 3 is a graph representing the SCR Age concept and the SCR aging model. The Y axis 126 is SCR aging factor, and the X axis 128 is the SCR temperature in Celsius. An SCR aging factor may be created based upon SCR aging test results. For purposes of this representation, the aging factor was assumed to be at about 700° C. The model sought to establish a correlation between SCR age and NOx reduction efficiency. Line 130 shows the aging factor as it relates to increasing temperature. It can be seen that the SCR does not appreciably begin to age until the SCR reaches about 600 to 650° C., at which point the SCR begins a steep aging. When the SCR reaches 7000C, the aging factor has gone from about 0.2 at 650° C. to about 1.0 at about 700° C. The SCR age concept can be understood by the relation $$Age_{SCR} = \Sigma factor_{age} \times t_{step}$$

Wherein t is time.

Figure 4:
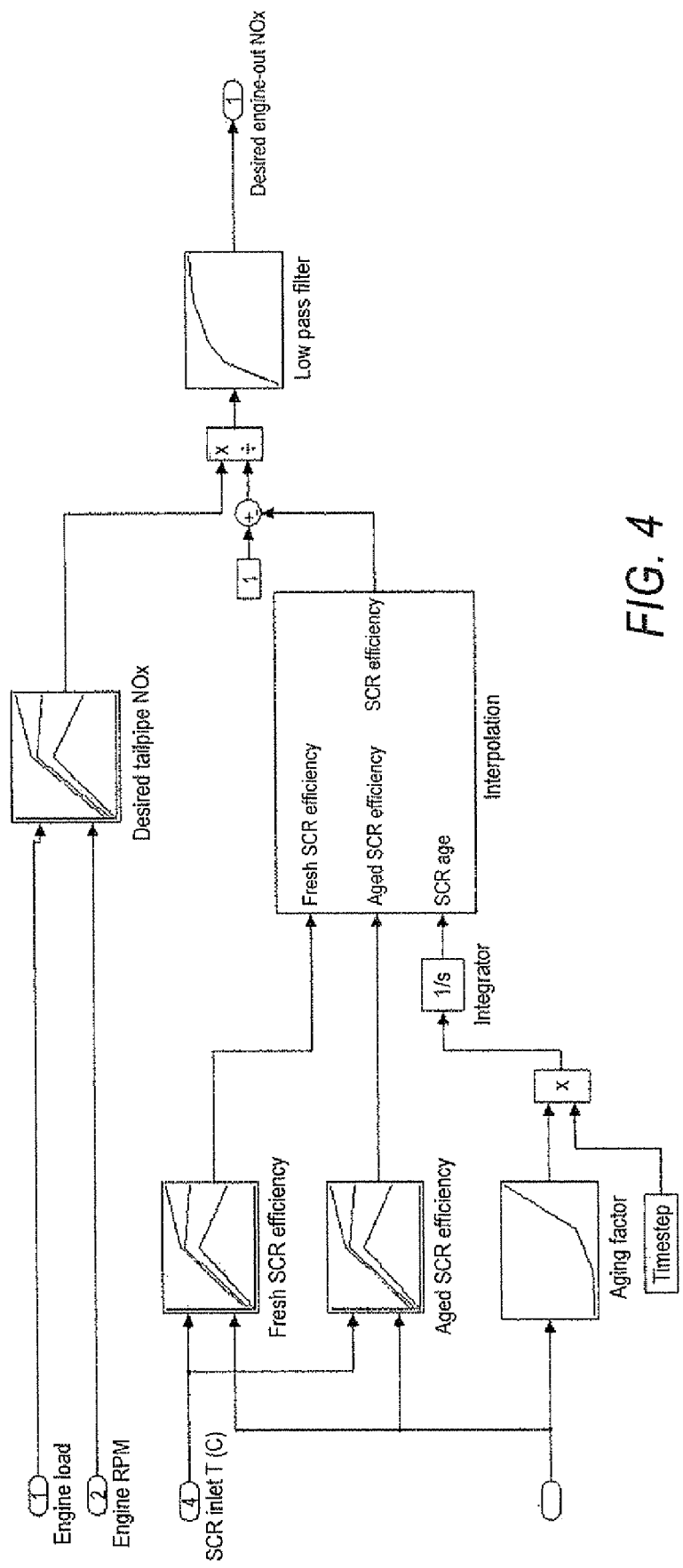
FIG. 4 is a schematic representation of a flowchart showing the desired Engine Out NOx determination according to one aspect of the present invention.

FIG. 4 is a flowchart of the desired engine out NOx determination 130 according to one aspect of the present invention. Specifically, engine load 132 and engine speed 134 are used as inputs in a 3D table 136 to determine desired tailpipe NOx. In addition, exhaust mass rate 138 is input to a 3D table 140 to determine the fresh SCR efficiency, as well as input to a 3D table 142 to determine aged SCR efficiency. Similarly, SCR inlet Temperature is input into table 140 and 3D table 142. In addition, SCR inlet temperature is used as an input in 3D table 144 to determine an aging factor.

A time step is multiplied by the Aging factor and subjected to filtering at 146 and passed through an integrator 148. The resulting SCR age 150, the fresh SCR efficiency 152 and the aged SCR efficiency 154 are subjected to interpolation and the resulting SCR efficiency 156 is subtracted from 1 and that sum is added to a filter. The desired tailpipe NOx is divided by the 1—the efficiency factor of the SCR and passed through a low pass filter to determine the desired engine out NOx 158. The desired engine out NOx based on desired tailpipe NOx setpoint value and SCR NOx reduction efficiency may be represented by the formula $$NOx_{de\text{-}engine\ out} = \frac{NOx_{des\text{-}tailpipe\text{-}out}}{1 - \eta_{scr}}$$

Wherein η is the efficiency factor of the SCR.

The desired engine out NOx based on desired tailpipe NOx setpoint value and SCR NOx reduction may be assumed to be linearly deteriorating with age and it is contemplated to build a SCR aging factor function into the controller to ensure this application.

Figure 5:
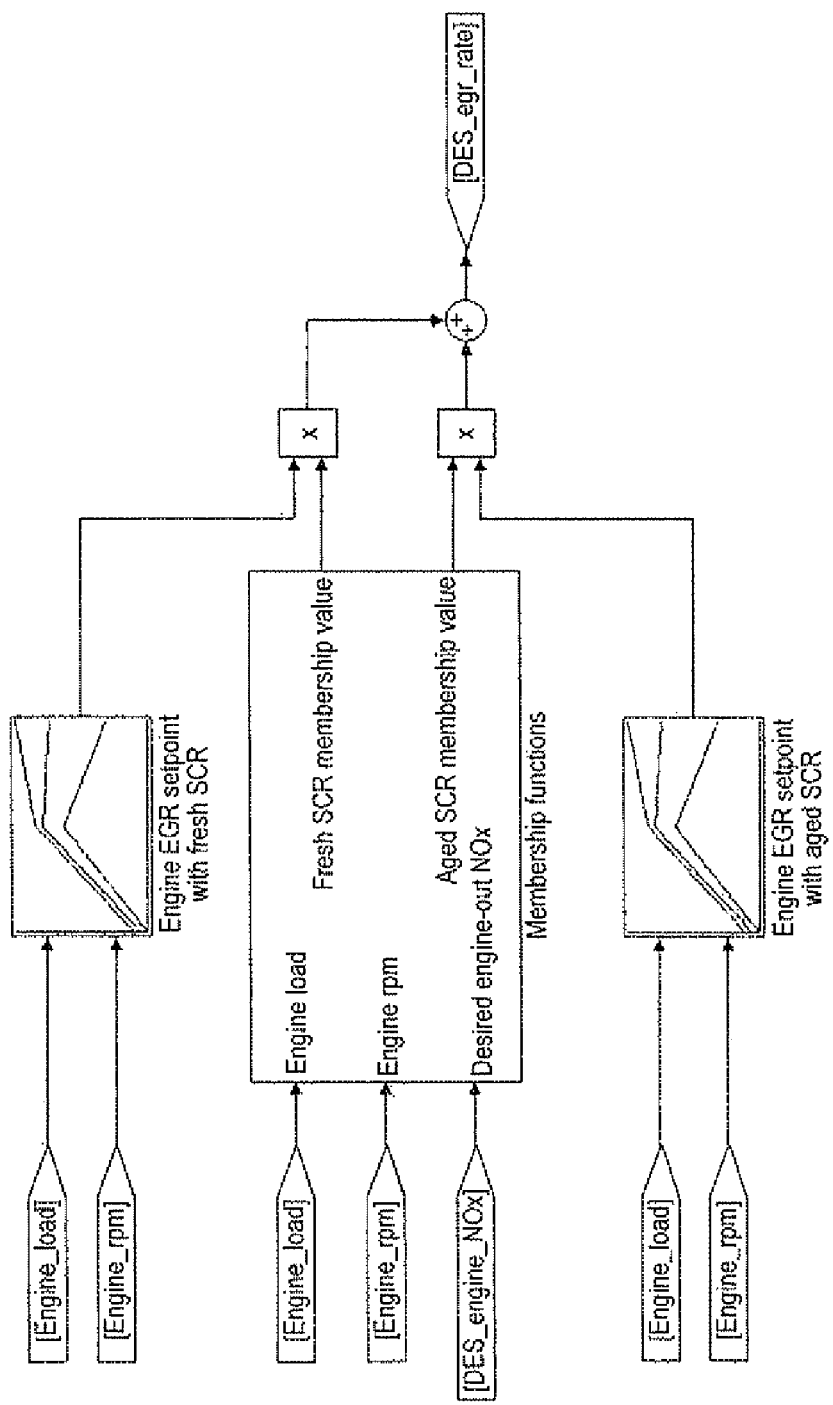
FIG. 5 is a schematic representation of a flowchart showing the fuzzy logic based setpoint management useful according to one aspect of the present invention.

FIG. 5 is a representation of the fuzzy logic based setpoint management 160 according to one aspect of the present invention. EGR will be illustrated, but any engine operating parameter may be substituted for the EGR, such as, without limitation, beginning of injection (BOI) and NOP setpoints. Specifically, engine load 162 and engine speed 164 are input into 3D table 166 to determine engine EGR setpoint with fresh SCR 168. In addition, engine load and speed, as well as Desired Engine NOx 170 are input to membership functions 172 to determine Fresh SCR membership value 174 and aged SCR membership value 176. In addition the engine load and engine speed are input to 3D table 178 to determine engine EGR setpoint with aged SCR. The Engine EGR setpoint with fresh EGR 180, and the Fresh SCR membership value are multiplied as are the Aged SCR value and the engine EGR setpoint with aged EGR 182. The resulting products are added together to arrive at the desired EGR rate based upon SCR aging membership value and desired EGR rates at fresh and aged SCR conditions. This fuzzy logic may be represented by the formula $$des\Gamma rate = des\Gamma rate_{fresh\_SCR} \times Y_{fresh\_SCR\_membership} + des\Gamma\_rate_{aged\_SCR} \times Y_{aged\_SCR\_membership}$$

wherein:

Y is the SCR efficiency value and

Γ is an engine operating parameter (such as the EGR).

Figure 6:
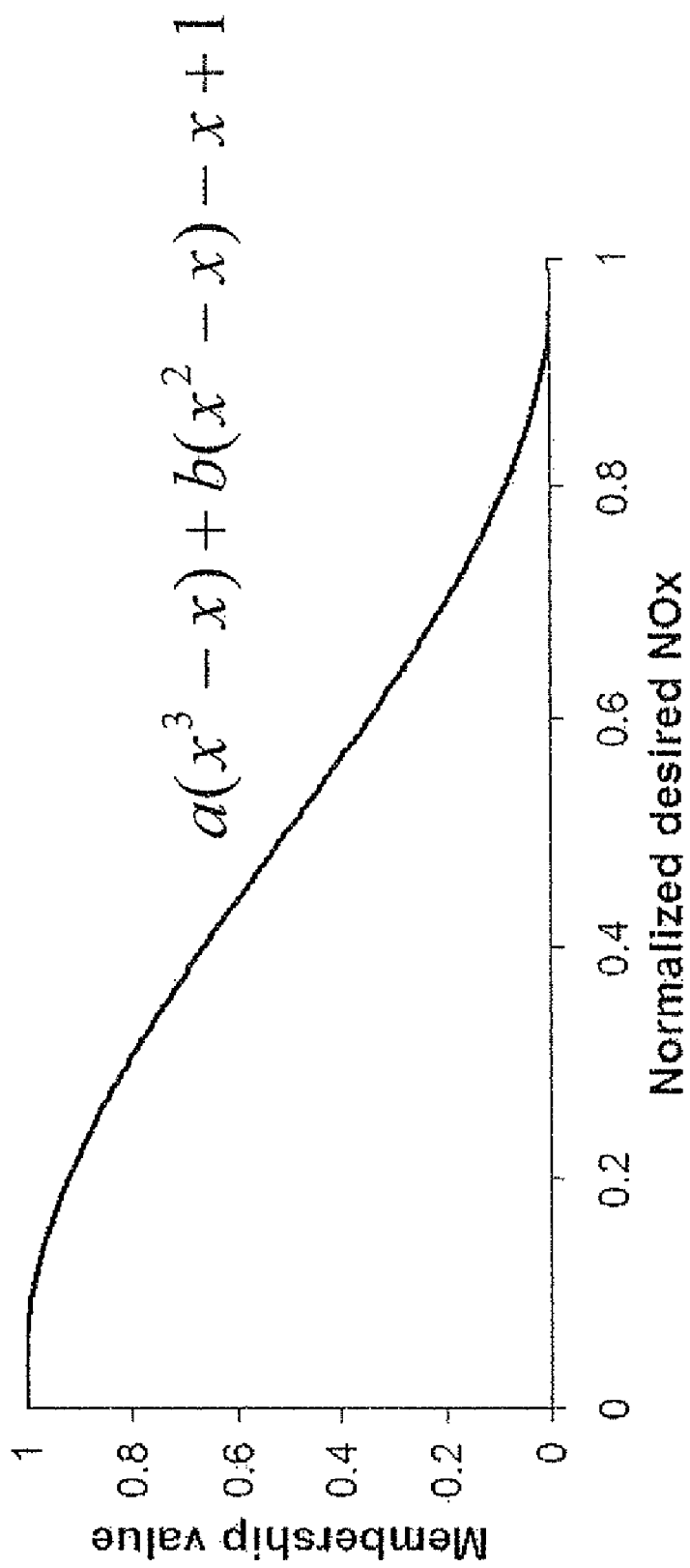
FIG. 6 is a chart showing Fuzzy Logic Membership Function according to one aspect of the present invention.

FIG. 6 is a representation of a graphic relationship illustrating the fuzzy logic membership function. The graph 184 has an X axis 186 which is the normalized desired NOx and the Y axis 188 is the membership value. Curve 190 is the relationship between the membership value and the normalized desired NOx, and is represented by the formula $$a(x3-x)+b(x2-x)-x+1$$

wherein a and b are 3D tables with engine rpm and load as inputs, $$a = f_a(\text{rpm, load})$$
$$b = f_b(\text{rpm, load})$$

and $$des\ NOx_{normalized} = \frac{des\ NOx_{current} - des\ NOx_{fresh\_SCR}}{des\ NOx_{aged\_SCR} - des\ NOX_{fresh\_SCR}}$$

It can be understood that when both a and b are zero, the fuzzy logic becomes a linear interpolation.

In order to determine fresh and aged SCR engine setpoint tables, the EGR, BOI and NOP and any other engine operating parameter is input into a 3D table. At each operation setpoint, 5 to 6 EGR, BOI or NOP, or any other engine operating parameter rates may be used between fresh and aged SCR rates, such as for example EGR rates. For EGR, the engine is tested at each EGR rate, varying the other engine operating parameters such as BI, or NOP. The NOx, particulate matter (PM) and BSFS at each combination of EGR, BOI and NOP is recorded. At a given NOx with minimum BSFC and accepted PM, the combination of EGR, BOI and NOP is determined. The membership function constants a and b for EGR, BOI and NOP are then determined. It is further understood that the membership function does not have units and may maintain the same while the engine hardware changes slightly.

FIG. 6 is the engine out NOx closed loop control 192 according to one aspect of the present invention. Specifically, inputs 194 are input to a fuzzy logic based setpoint management 196. At step 198, Normalized desired NOx 200 subtracts Normalized actual NOx at filter 202 to determine the Delta NOx. The Delta NOx is passed through a filter constant 204. The filtered Delta NOx and the normalized NOx are input into an adaptive logic, where they are filtered. The normalized desired NOx is also filtered through the same adaptive logic and the resulting filtered value is subtracted from the Delta NOx at 206 and the resulting value is subtracted from the normalized desired NOx at 208 and input to the fuzzy logic based setpoint management. Steps 202 through 208 all occur within a closed loop correction in a closed loop control portion 210. The fuzzy logic based setpoint management then determines the current desired EGR 212, the current desired BOI 214 and the current desired NOP 216.

Figure 7:
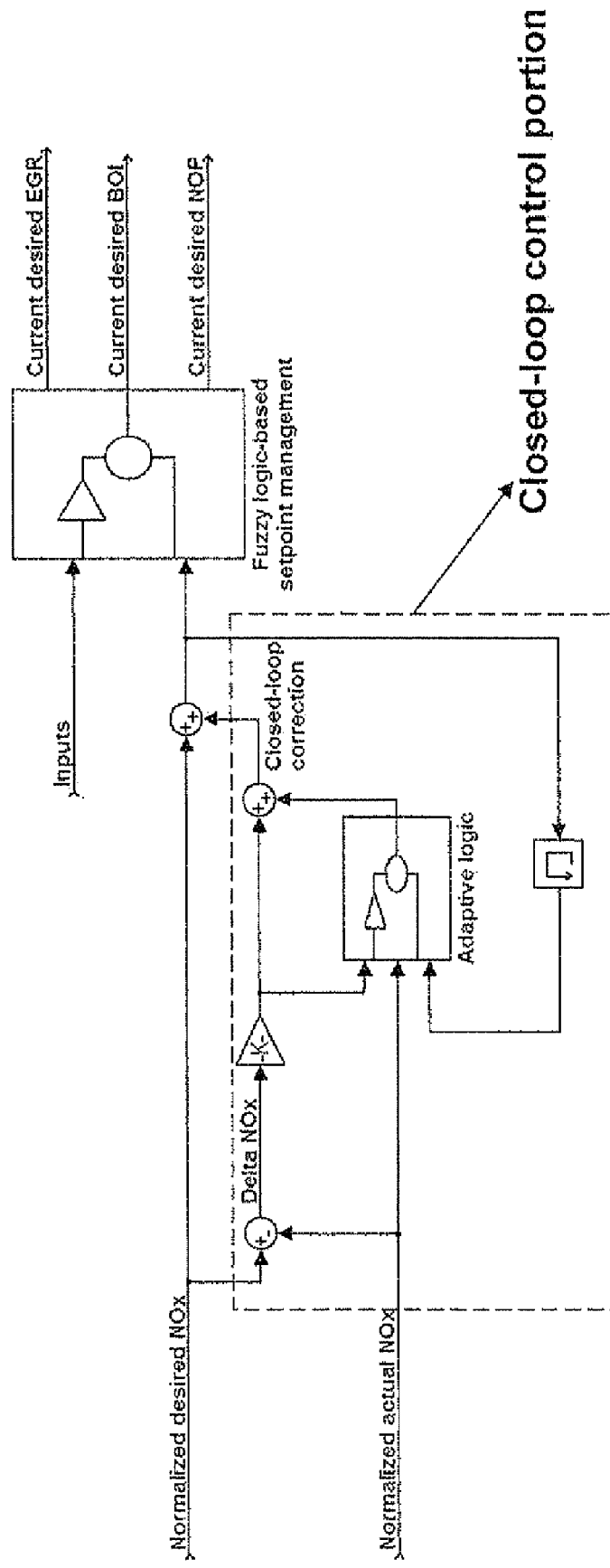
FIG. 7 is a schematic representation of an engine out NOx closed loop control according to one aspect of the present invention.
Figure 8:
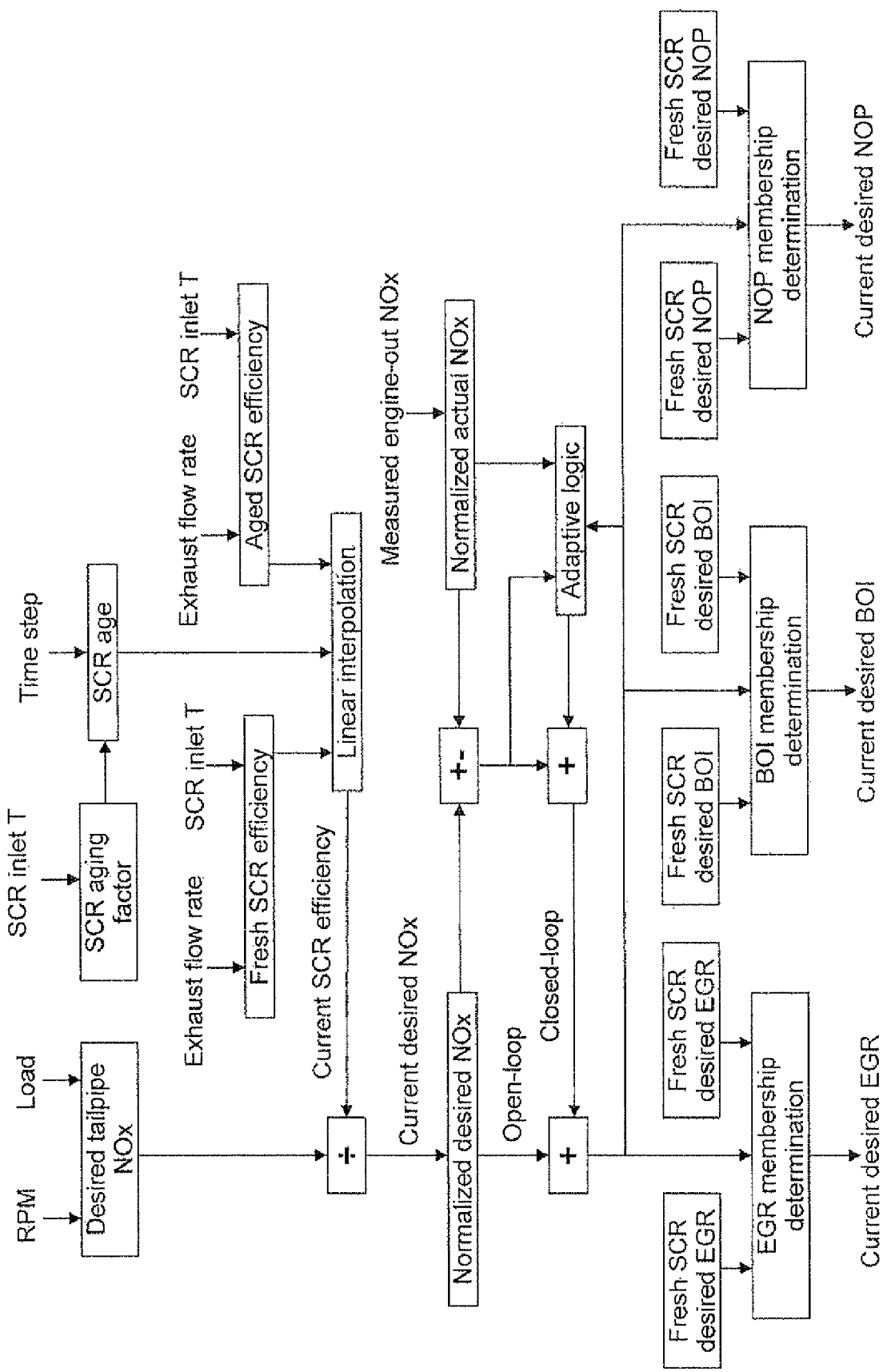
FIG. 8 is a representation of a variable engine NOx emission control logic flow chart according to one aspect of the present invention.

FIG. 7 is a schematic representation of one control logic flow chart 218 for variable engine NOx emission according to the present invention. Specifically, Engine RPM and load are input to determine desired tailpipe NOx. Simultaneously, SCR inlet temperature and time step are used to determine SCR aging factor and SCR age. The SCR age may be subjected to linear interpolation together with input from exhaust flow rate and SCR inlet temperature to determine Fresh SCR efficiency, and exhaust flow rate and SCR inlet temperature in determine aged SCR efficiency. The linear interpolation of these factors is divided by the desired tailpipe NOx to determine the normalized desired NOx. Measured engine out NOx is used to determine the normalized actual NOx and the normalized actual NOx is subtracted=from the Normalized desired NOx. The result is added to an adaptive logic together with the normalized actual NOx and normalized desired NOx in a closed loop logic. The resulting sum is used together with the fresh SCR desired EGR to determine the EGR membership, which in turn, yields the current desired EGR. Similarly, the Fresh SCR BOI and the resulting sum of the closed loop operation determine the BOI determination that yields the current desired BOI and the fresh SCR and desired NOP are input with the resulting sum of the closed loop operation to determine the NOP membership to yield the current desired NOP.

The words used in the specification are words of description, and not words of limitation. Those skilled in the art recognize that many variations and modifications are possible without departing from the scope and sprit of the invention as set forth in the appended claims.

The invention claimed is:

1. A method to operate an internal combustion engine equipped with an electronic control system (ECS) having memory, and an exhaust system including a diesel particulate filter (DPF) and a Selective Catalytic Reducer (SCR) for NOx emission reduction over all ages of said SCR, comprising:

determining the age of the SCR with an age factor;

determining SCR efficiency using SCR age as a factor of SCR efficiency;

determining desired tailpipe NOx emissions as setpoints to control engine out NOx emissions;

determining desired engine out NOx emission by using current SCR efficiency and desired tailpipe NOx emissions;

using fuzzy logic to manage engine control setpoints which forms a forward control portion of the said ECS; and using closed loop engine out NOx sensor feedback control to accurately control engine out NOx emissions.

2. The method of claim 1, wherein said engine control setpoints include beginning of injection (BOI) exhaust gas recirculation valve (EGR), and nozzle opening pressure (NOP).

3. The method of claim 1, wherein said NOx setpoints are determined from a 3D table in memory with engine load and engine rpm as inputs.

4. The method of claim 1, wherein controlling engine out NOx according to SCR deterioration age includes determining the efficiency of the SCR and the amount of NOx engine out emission produced in a predetermined time period, reducing engine fuel consumption based upon said SCR efficiency and NOx engine out and maximize DPF regeneration, extending the DPF active regeneration interval.

5. The method of claim 1, wherein said SCR aging factor is determined according to the formula $$Age_{SCR} = \Sigma factor_{age} \times t_{step}$$

Wherein t is time.

6. The method of claim 1, wherein said desired engine out NOx is determined based upon desired tailpipe NOx setpoint value and SCR NOx reduction efficiency according to the formula $$NOx_{de\text{-}engine\ out} = \frac{NOx_{des\text{-}tailpipe\text{-}out}}{1 - \eta_{scr}}$$

Wherein $\eta$ is an efficiency factor of the SCR.

7. The method of claim 1, wherein said fuzzy logic based setpoint management is determined according to the formula $$des\Gamma rate = des\Gamma rate_{fresh\_SCR} \times Y_{fresh\_SCR\_membership} + des\Gamma\_rate_{aged\_SCR} \times Y_{aged\_SCR\_membership}$$

wherein:

Y is the SCR efficiency value and $\Gamma$ is an engine operating parameter.

8. The method of claim 7, wherein with engine load, engine rpm and desired engine out NOx as inputs, EGR, BOI and NOP relations at conditions of minimum BSFC, given exhaust temperature and acceptable particulate matter (PM) rate are defined.

9. The method of claim 7, wherein said fuzzy logic membership function is performed according to the formula:

$$a(x3-x)+b(x2-x)-x+1$$

wherein a and b are 3D tables with engine rpm and load as inputs, $a = f_a(\text{rpm, load})$ $b = f_b(\text{rpm, load})$ and $$des\ NOx_{normalized} = \frac{des\ NOx_{current} - des\ NOx_{fresh\_SCR}}{des\ NOx_{aged\_SCR} - des\ NOX_{fresh\_SCR}}.$$

10. The method of claim 9, wherein when a and b are zero, the fuzzy logic become linear interpolation.

11. The method of claim 9, wherein when determining fresh and aged SCR engine setpoints, table for EGR, BOI and NOP, for each operation point choosing between 5 and 6 EGR rate between fresh and aged SCR EGR rates; conducting engine tests at each EGR rate varying BOI and NOP; recording NOx, PM and BSFC at each combination of EGR, BOI and NOP; combining EGR, BOI and NOP at a given NOx with minimum BSFC and accepted PM, and determining a membership function constant a and b for EGR, BOI and NOP.

12. The method of claim 1, further including using closed loop control to commensurate for engine to engine variation and reduce calibration effort.

13. The method of claim 1, further including adaptive logic to address any conflict between PID control stability and response.

* * * * *